US008380575B2

(12) United States Patent
Foygel et al.

(10) Patent No.: US 8,380,575 B2
(45) Date of Patent: Feb. 19, 2013

(54) SYSTEM AND METHODS FOR RISK-BASED PRIORITIZED TRANSACTION MESSAGE FLOW

(75) Inventors: Alexander V. Foygel, Highland Park, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 244 days.

(21) Appl. No.: 12/637,971

(22) Filed: Dec. 15, 2009

(65) Prior Publication Data

US 2011/0145125 A1 Jun. 16, 2011

(51) Int. Cl.
*G06Q 30/00* (2012.01)
(52) U.S. Cl. .................................. 705/26.1; 705/37
(58) Field of Classification Search .............. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| 7,113,924 | B2 | 9/2006 | Fishbain |
| 7,124,110 | B1 | 10/2006 | Kemp, II et al. |
| 7,197,483 | B2 | 3/2007 | Brady et al. |
| 7,437,325 | B2 | 10/2008 | Kemp, II et al. |
| 7,461,009 | B1 * | 12/2008 | Haulk et al. ............ 705/20 |
| 7,523,064 | B2 | 4/2009 | Burns et al. |
| 7,801,129 | B2 * | 9/2010 | Batteram et al. ......... 370/389 |
| 7,980,457 | B2 | 7/2011 | Kaminsky et al. |
| 8,090,641 | B1 * | 1/2012 | Monroe ..................... 705/37 |
| 2003/0236737 | A1 | 12/2003 | Kemp, II et al. |
| 2004/0233055 | A1 * | 11/2004 | Canich et al. ........... 340/539.26 |
| 2006/0015436 | A1 | 1/2006 | Burns et al. |
| 2007/0253412 | A1 * | 11/2007 | Batteram et al. ......... 370/389 |
| 2008/0097887 | A1 * | 4/2008 | Duquette et al. ............. 705/37 |
| 2008/0115079 | A1 | 5/2008 | Mather |
| 2008/0162378 | A1 | 7/2008 | Levine et al. |
| 2008/0208734 | A1 | 8/2008 | Kaminsky et al. |
| 2008/0288391 | A1 | 11/2008 | Downs et al. |
| 2009/0089199 | A1 | 4/2009 | Waelbroeck et al. |
| 2009/0132409 | A1 | 5/2009 | Lutnick et al. |
| 2009/0164233 | A1 * | 6/2009 | Arnold et al. .................. 705/1 |
| 2010/0138334 | A1 | 6/2010 | Warsaw et al. |
| 2010/0228833 | A1 * | 9/2010 | Duquette et al. ........... 709/207 |
| 2010/0238839 | A1 * | 9/2010 | Batteram et al. ........... 370/254 |
| 2010/0332367 | A1 | 12/2010 | Foygel et al. |

(Continued)

OTHER PUBLICATIONS

Kalagnanam, Jayant, and David C. Parkes. 2004. Auctions,bidding and exchange design. In Handbook of Quantitative Supply Chain Analysis: Modeling in the E-Business Era, ed. D.Simchi-Levi, S. D. Wu, Z. Shen, 143-212. Boston: Kluwer.*

(Continued)

*Primary Examiner* — Naeem Haq
(74) *Attorney, Agent, or Firm* — McDonnell Boehnen Hulbert & Berghoff LLP

(57) ABSTRACT

Various systems and methods are provided for prioritized sending of transaction messages to an electronic exchange. According to one embodiment, a system determines a priority level for each transaction message based on a potential monetary reward or risk associated with sending or delaying the message. Once the priority levels are determined, the messages may be sent based on the priority levels. Additionally, each priority level may be associated with a predetermined threshold level. If a message threshold is reached, a new message corresponding to that priority level is queued until the message may be transmitted without exceeding the threshold limit.

8 Claims, 3 Drawing Sheets

U.S. PATENT DOCUMENTS

2011/0040669 A1* 2/2011 Lee et al. .................... 705/37
2011/0184849 A1* 7/2011 Duquette et al. ............. 705/37
2012/0066115 A1* 3/2012 Monroe ....................... 705/37

OTHER PUBLICATIONS

Unpublished U.S. Appl. No. 12/492,536, filed Jun. 26, 2009 entitled "Prioritization of Trade Order Processing in Electronic Trading".
U.S. Appl. No. 12/492,536, Final Office Action mailed Jan. 23, 2012.
International Preliminary Report on Patentability, mailed Jan. 12, 2012, for International Application No. PCT/US10/37106.
U.S. Appl. No. 12/492,536, Non-Final Office Action mailed Sep. 9, 2011.
International Search Report of International Application No. PCT/US2010/037106 dated (mailed Jul. 30, 2010).
Chiu, I. H-Y., "Securities Intermediaries in the Internet Age and the Traditional Principal-Agent Model of Regulation: Some Observations from European Union Securities Regulation," *Virginia Law & Business Review*, Fall 2007, vol. 2, No. 2, pp. 307-361.

* cited by examiner

SYSTEM AND METHODS FOR RISK-BASED PRIORITIZED TRANSACTION MESSAGE FLOW

BACKGROUND

A number of inventions are disclosed herein that are directed towards electronic trading systems. More particularly, certain embodiments of the inventions are directed towards managing financial transaction messages.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices. An example of an electronic exchange is the CME® Globex® electronic trading platform, which is offered by the Chicago Mercantile Exchange (CME).

Orders and quotes indicate a willingness to buy and/or sell, and are often revised and resubmitted by traders to reflect changes in their desired positions. Traders often revise their transactions to reflect even small changes in the market. When market prices move rapidly, the changes in the market may result in a large number of transaction messages being submitted to an exchange. Excessive quoting (which refers to any type of transaction messages including orders and quotes) may place a huge burden on the exchange.

Many exchanges impose limits or restrictions on the communication messages received from their members or member firms. The limits are generally intended to ensure that the exchange computer system is not overburdened, and to dissuade members from submitting excessive or unnecessary messages. Limits may be enforced in various manners. For example, in relation to "hard limits," an exchange may reject or queue (or delay) transaction messages once a limit has been reached. Another example involves "soft" limits, where an exchange may charge fees or penalties for transaction messages once a limit has been reached. For example, the limits may include a cap on "in-flight" transactions. In-flight transactions are those transactions that have been submitted to the exchange for which the exchange has not provided a return confirmation of receipt.

Different types of limits could be used as well. For example, an exchange may limit a number of transactions that may be submitted by a member in a given time period. Alternatively, an exchange may limit the overall aggregate measure of message traffic. For example, the message traffic may be measured in bytes in a given time period. This is commonly referred to as data transmission rate or bandwidth usage.

With the increased use of automated trading tools, reaching or exceeding the preset limits may occur rather easily. Indeed, the use of such tools can easily over-burden an exchange's message handling capacity. As such, some exchanges require the use of software at gateways that prevents the message traffic from exceeding specific limits.

Thus, it is important to provide tools that assist in managing of transaction messages to be sent to an electronic exchange.

SUMMARY

Certain embodiments of the inventions provide a method for risk-based or reward-based management of transaction messages in an electronic trading environment.

The example methods and systems described herein prioritize transaction messages based on a potential risk (or loss) associated with not sending a transaction message as soon as possible, or based on the potential reward (or profit) associated with sending the transaction message as soon as possible. The two measures can be used interchangeably. According to example embodiments described in greater detail below, the messages are sent based on the assigned priority levels, with the messages having the highest priority levels being sent before any lower priority messages.

According to some embodiments, a potential reward/potential risk may be measured based on satisfying/not satisfying a specific condition for an order. For example, the condition may be based on a desired price for an order, and the potential risk may be determined based on the order not getting executed at the desired price. According to an example embodiment, if an order corresponding to a trading strategy, such as a spread, is sent too late, the trader risks getting legged and not achieving a desired price for the trading strategy, as the market conditions might quickly change. The potential reward/risk may also be based on a potential profit or loss, such as when a hedge order is submitted to hedge a position created by another order corresponding to the same trading strategy, or when synthetic orders are used, such as a trailing stop or a trailing limit, for example.

More specifically, and as will be described in greater detail below, the potential risk/reward for an order may be determined based on an order price compared to the current market conditions, and further based on an order quantity. For example, if two orders are working in the market and are to be re-quoted based on changed market conditions, the order having a larger order quantity at a price level closer to the current inside market may be associated with a much higher risk than the order having a smaller order quantity at a price level that is farther away from the current inside market. In other words, if the order having a higher order quantity and working closer to the current inside market is filled before it is re-quoted, a trader may incur a much higher monetary loss due to not achieving a desired trading strategy, as compared to a potential loss of getting the second order filled.

Additionally, when two orders are to be sent for two different tradeable objects, a tick value for each tradeable object may be considered when determining a potential risk associated with each order. A tick value is a cash value of one tick (one minimum price movement). For example, a tick value for a first tradeable object may be $1, while a tick value for a second tradeable object may be $10. Then, if two orders having the same order quantities and the price levels one tick away from the current inside markets are to be sent substantially at the same time to the two markets, the order corresponding to the second tradeable object may be associated with a higher risk, or a higher priority level, and thus may be sent first. In other words, based on the tick value of each tradeable object, the monetary risk associated with not sending the order for the second tradeable object is higher as compared to the monetary risk of not sending the first order.

According to yet other embodiments, a method includes defining a transaction message transmission policy. The policy sets how message resources are utilized according to a priority-based hierarchy. Each priority level, as explained above, may be based on a potential reward (profit) or risk (loss) associated with sending or not sending a transaction message as soon as possible to an electronic exchange. According to the example embodiments described in greater detail below, the order of sending transaction messages to an electronic exchange is based on a priority level assigned to each transaction message. Additionally, each priority level may be associated with a predetermined threshold that is used to control sending transaction messages corresponding to each priority level. As transaction messages corresponding to a given priority level are being sent, the message threshold counters for that priority level are decremented such that the number of messages assigned to the priority level is not exceeded. According to an example embodiment, if a message threshold corresponding to a given priority level is reached, a new transaction message corresponding to that priority level may be queued until the next message may be transmitted without exceeding the threshold limit.

Different embodiments for risk-based management of transaction messages are described in greater detail below. In addition, modifications may be made to the described embodiments without departing from the spirit or scope of the invention.

BRIEF DESCRIPTION OF THE DRAWINGS

Example embodiments are described herein with reference to the following drawings.

Figure 1:
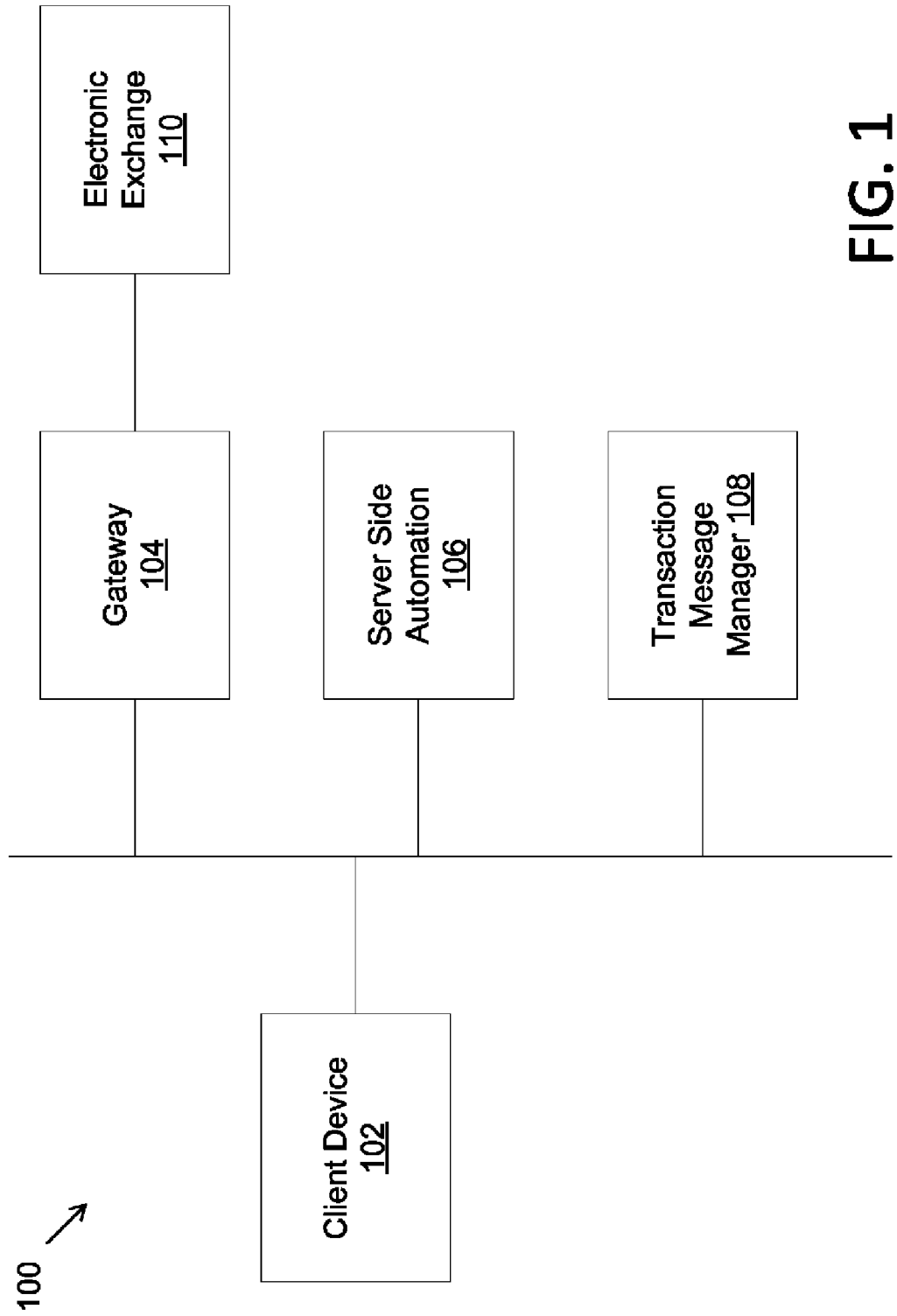
FIG. 1 illustrates a block diagram of an electronic trading system in which certain embodiments may be employed.

The foregoing summary, as well as the following detailed description, will be better understood when read in conjunction with the drawings which show certain embodiments of the present invention. The drawings are for the purpose of illustrating certain embodiments, but it should be understood that the present invention is not limited to the arrangements and instrumentality shown in the drawings.

DETAILED DESCRIPTION

Various systems and methods are described herein for use in managing transaction messages related to tradeable objects in an electronic trading environment. More specifically, an example method includes assigning a priority level to each transaction message to be sent to an electronic exchange based on a potential reward and risk associated with submitting (or not submitting) the transaction message to the electronic exchange, and sending the messages to the exchange based on the assigned priority levels. Moreover, message transmission limits may be defined for each priority level such that if a message threshold assigned to a given priority level is reached, the next transaction message having that priority level may be queued until the message may be transmitted without exceeding the threshold limit.

As used herein, a "tradeable object" refers to anything that can be traded with a price, a quantity, or both price and quantity. For example, financial products such as stocks, options, bonds, futures, currency, warrants, funds derivatives, commodities, and collections or combinations of these may be tradeable objects. A tradeable object may be "real" or "synthetic." A real tradeable object includes products that are listed by an exchange. A synthetic tradeable object is defined by a user and is not listed by an exchange. For example, a synthetic tradeable object may include a combination of real (or other synthetic) products, such as a synthetic spread. A tradeable object may also include traded events or goods, for example.

FIG. 1 illustrates an example electronic trading system 100 in which certain embodiments may be employed. The system 100 includes a client device 102, a gateway 104, a server side automation device ("SSA") 106, a transaction message manager 108, and an electronic exchange 110. According to the example illustrated in FIG. 1, client device 102 communicates with gateway 104, and gateway 104 communicates with electronic exchange 108. SSA 106 may be in communication with client device 102, gateway 104, and transaction message manager 108. Finally, transaction message manager 108 may be in communication with client device 102, gateway 104, and SSA 106. It should be understood that transaction message manager 108 may be a part of SSA 106 or may be executed on the same computing device as SSA 106.

According to one example embodiment, client device 102 may be used to send transaction messages to exchange 110, and to receive messages from exchange 110. As used herein, the terms "transaction messages" and "messages" refer to any number of different types of messages, including orders, quotes, acknowledgements, fills, cancels, deletes, cancel and replace, and other well-known financial transaction messages. Additionally, it should be understood that a transaction message may be used to initiate a new order, or to modify an existing order already pending or working at an electronic exchange. A trade order can be modified for any number of reasons, but one common example may include a modification initiated by an automatic trading tool that modifies an existing order to achieve a desired trading strategy. Some modifications may be triggered upon detecting a change in market conditions associated with one or more tradeable objects. Examples of a modification may include changing the price of an existing order, canceling the order and replacing it with a new order at a new price, changing the order quantity, canceling the order, changing the order type, changing an execution condition, or modifying any other parameter related to the trade order.

System 100 is preferably configured to manage any and all transaction messages. In addition, market data may be sent from exchange 110 through gateway 104 to client device 102. The user may utilize client device 102 to monitor market data and may base decisions to send an order for a tradeable object on the market data. Trading decisions at client 102 may be manual or automated.

Client device 102 may include one or more electronic computing devices such as a hand-held device, laptop, personal computer, workstation with a single or multi-core processor, server with multiple processors, and/or cluster of computers, for example. A present day commercial example might include a computing device that utilizes the Windows XP® professional operating system and has at least 2 GB of memory, two dual-core or two quad-core processors, a network card, and at least 10 GB of hard drive space to accommodate software.

Client device 102 may also be configured to run one or more trading applications. The trading application(s) may, for example, process market data by arranging and displaying the market data in trading and charting windows. This data processing may be based on user preferences, for example. In addition to manual style trading tools, the trading application(s) may include an automated trading tool such as an automated spread trading tool, for example. In another example, client device 102 may be a computing system running a copy of X_TRADER™, an electronic trading platform provided by Trading Technologies International, Inc. of Chicago, Ill. Regardless of the type of trading application, client device 102 may be configured to send orders to buy and sell tradeable objects listed at exchange 110 as well as other transaction messages, as defined above. Client device 102, including the one or more trading applications, may also be configured to operate with one or more trading applications at SSA 106, more of which is described below.

Orders sent by client device 102 may be sent at the request of a user, manually or automatically. According to one example, a trader may utilize an electronic trading workstation to place an order for a particular tradeable object, manually providing various parameters for the order such as an order price and/or quantity. In another example, an automated trading tool at client device 102 may calculate one or more parameters for an order and automatically send the order, as well as other transaction messages.

In certain embodiments, client device 102 includes a user interface. The user interface may include one or more display devices for presenting a text-based or graphical interface to a user, for example. The display devices may include computer monitors, hand-held device displays, projectors, and/or televisions. The user interface may be used by a user to specify or review parameters for an order. The user interface may include one or more input devices for receiving input from a user, for example. The input devices may include a keyboard, trackball, two or three-button mouse, and/or touch screen. The user interface may include other devices for interacting with a user. For example, information may be aurally provided to a user through a speaker and/or received through a microphone.

In certain embodiments, orders from client device 102 are sent on to exchange 110 through gateway 104. As will be described in greater detail below, the priority of sending orders to exchange 110 may be determined at transaction message manager 108. Client device 102 may communicate with gateway 104 using a local area network or wide area network, a virtual private network, a T1 line, a T3 line, a point-of-presence, and/or the Internet, for example.

SSA 106 is used to send transaction messages, such as orders to buy or sell a tradeable object, at exchange 110 on behalf of a user of client device 102. Orders to be placed at exchange 110 via SSA 106 are sent through gateway 104, while transaction message manager 108 may manage the order of sending transaction messages, as will be described in greater detail below. SSA 106 may monitor the market data and may send an order for a tradeable object based on the market data. Trading decisions at SSA 106 are generally automated based on user-defined trading strategies, and it may be possible for a user of client device 102 to intervene manually.

SSA 106 may include one or more electronic computing platforms such as a personal computer, workstation with a single or multi-core processor, server with multiple processors, and/or clusters of computers, for example. A present day commercial example of a computing device utilizes Windows 2003 Server® (Server Pack 2) operating system and has at least 4 GB of memory, two dual-core or two quad-core processors, one or more network cards, and at least 30 GB of hard drive space to accommodate software.

In certain embodiments, SSA 106 is used to implement automated or semi-automated trading programs (collectively referred to herein as automated trading programs). Transaction messages may be sent directly from SSA 106 to exchange 110 through gateway 104, with the use of transaction message manager 108. Transaction messages may also be sent from another computing device to exchange 110 via instructions from SSA 106, for example. In certain embodiments, SSA 106 is configured to implement an automated trading program on behalf of a user of client device 102. An example trading application that may run on SSA 106 is an automated trading tool like that disclosed in U.S. Pat. No. 7,437,325, the contents of which are incorporated herein by reference. The commercial embodiment of an automated spread trading tool is Autospreader®, which is offered by Trading Technologies International. Different automated trading applications could also run on SSA 106 and client device 102, such as those described in U.S. patent application Ser. No. 10/284,584, entitled "System and Method for Automated Trading," the contents of which are incorporated herein by reference. The Autospreader®, as well as other automated trading applications, can be configured to operate at client device 102, SSA 106, or both the client device 102 and SSA 106.

In certain embodiments, SSA 106 is physically located at the same site as client device 102. In certain embodiments, SSA 106 is physically located at the same site as exchange 110. Alternatively, SSA 106 may be collocated with gateway 104. Further alternatively, SSA 106 is physically located at a site separate from both the client device 102 and exchange 110. In certain embodiments, regardless of the location of SSA 106, client device 102 and SSA 106 may together be considered part of the "client side" of system 100, because SSA 106 may be operating on behalf of a user at client device 102, for example.

Gateway 104 may include one or more electronic computing platforms such as a personal computer, workstation with a single or multi-core processor, server with multiple processors and/or clusters of computers, for example. In certain embodiments, gateway 104 is physically located at the same site as client device 102. In other embodiments, gateway 104 is physically located at the same site as exchange 110. In yet other embodiments, gateway 104 is physically located at a site separate from both the client device 102 and the exchange 110.

In certain embodiments, gateway 104 communicates with client device 102 and/or SSA 106 using a local area network, a wide area network, a virtual private network, a T1 line, a T3 line, a point-of-presence, and/or the Internet, for example.

Gateway 104 is adapted to communicate with client device 102 and exchange 110. Gateway 104 facilitates communication between client device 102, SSA 106, transaction message manager 108, and exchange 110. For example, gateway 104 may receive orders from client device 102 and SSA 106 and transmit the orders to exchange 110. As another example, gateway 104 may receive market data from exchange 110 and transmit the market data to client device 102, SSA 106 and/or transaction message manager 108. Gateway 104 may be used to implement certain embodiments of the present invention.

In certain embodiments, gateway 104 performs processing of data communicated between client device 102 and/or SSA 106 and exchange 110. For example, gateway 104 may process an order received from client device 102 and/or SSA 106 into a data format acceptable by exchange 110. Similarly, gateway 104 may transform market data in an exchange-specific format received from exchange 110 into a format understood by client device 102 and/or SSA 106. Gateway 104 may also track orders from client device 102 and/or SSA 106, and update the status of the order based on fill confirmations received from exchange 110, for example. As another example, gateway 104 may coalesce market data from exchange 110 and provide it to client device 102 and/or SSA 106.

Transaction message manager 108 performs priority-based processing of transaction messages to be sent to exchange 110. In other words, if two or more messages are to be sent at the same time, transaction message manager 108 may send a message corresponding to the highest priority level first. As will be described in greater detail in relation to FIG. 2, transaction message manager 108 also implements a transaction message transmission policy that sets priority-based resource utilization limits. When the transaction message manager 108 determines priority levels for each transaction message to be sent to exchange 110, it may send the transaction messages according to the assigned priority levels and may track message flow and resource usage based on the priority levels. Transaction message manager 108 may operate as a separate component, as part of SSA 106 or gateway 104, or any combination of devices.

Additionally, transaction message manager 108 may assign transaction message thresholds to different priority levels to ensure that transmission of any transaction message does not exceed a predefined number of messages permitted for a specific priority level. It should be understood that a specific threshold may be set for a single priority level or a group of priority levels. Also, creation of priority levels or grouping of priority levels may depend on a trading house or a trading community that utilizes the example system.

The threshold levels, or limits, may include, but are not limited to, the number of transaction messages per a time period, such as the number of transaction messages per second (e.g., using a "sliding window" to count messages transmitted within the last second), the total number of transaction messages during a trading day, the number of transaction messages that are "in-flight" (transaction messages that are submitted to an exchange that have not yet been acknowledged by the exchange), the number of data bytes per second, or the total number of bytes for the day. Limits may be selected so as to divide the available resources between the priority levels set for the transaction messages.

It should be understood that transmission thresholds may be set manually by a system administrator, or may be set automatically. Additionally, the thresholds may be dynamically readjusted. For example, if a threshold corresponding to the highest priority level is reached, but there are available resources corresponding to lower priority levels, at least a portion of the available resources may be dynamically reassigned from the lower priority level to the highest priority level. It should be understood that reassignment of the available resources may be based on many different triggers, such as detecting a transaction message from a specific user, a type of a transaction message, a priority level associated with a transaction message, or other criteria.

According to an example embodiment, in the event that transmission of a transaction message to exchange 110 would exceed a threshold limit, transaction message manager 108 may place the transaction message in a message queue until the message may be transmitted without exceeding the threshold limit. It should be understood that a number of message queues could be used at the transaction message manager 108, with each message queue used to queue messages corresponding to a specific priority level. In such an embodiment, if a threshold limit corresponding to a specific priority level is exceeded, any transaction messages corresponding to that priority level would be stored in the corresponding queue.

Transaction message manager 108 may include one or more electronic computing platforms such as a personal computer, workstation with a single or multi-core processor, server with multiple processors, and/or clusters of computers, for example. A present day commercial example of a computing device utilizes Windows 2003 Server® (Server Pack 2) operating system and has at least 4 GB of memory, two dual-core or two quad-core processors, one or more network cards, and at least 30 GB of hard drive space to accommodate software.

In certain embodiments, transaction message manager 108 is physically located at the same site as client device 102. In other embodiments, transaction message manager 108 is physically located at the same site as exchange 110. Alternatively, transaction message manager 108 may be collocated with gateway 104 or SSA 106. Further alternatively, transaction message manager 108 is physically located at a site separate from the client device 102, gateway 104, SSA 106, and exchange 110. In certain embodiments, regardless of the location of transaction message manager 108, client device 102 and transaction message manager 108 may together be considered part of the "client side" of system 100. Further alternatively, transaction message manager 108 may be considered part of the "server side" of system 100.

Electronic exchange 110 is configured to match orders to buy and sell tradeable objects. The tradeable objects may be listed for trading at exchange 110. The orders may include orders received from client device 102, SSA 106, or both. Orders may be received from client device 102, SSA 106, or both through gateway 104, for example. In addition, the orders may be received from other devices in communication with exchange 110. That is, typically, exchange 110 will be in communication with a variety of other client devices (which may be similar to client device 102) or other computing devices that also provide orders to be matched. As previously discussed, an example of electronic exchange 110 is the electronic trading platform offered by the CME®, which is presently headquartered in Chicago, Ill.

Exchange 110 is configured to provide market data. The market data may be provided to the client device 102, for example. The market data may be provided to client device 102, SSA 106, and/or transaction message manager 108 through gateway 104, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities (e.g., bids and offers) available at other prices away from the inside market. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, system 100 includes more than one client device 102. For example, multiple client devices similar to the client device 102, discussed above, may be in communication with gateway 104 and/or SSA 106 to send orders to exchange 110. Similarly, in certain embodiments, system 100 includes more than one SSA 106.

Additionally, system 100 may include more than one gateway 104. For example, multiple gateways similar to gateway 104, discussed above, may be in communication with client device 102 and/or SSA 106 and exchange 110. Such an arrangement may be used to provide redundancy should gateway 104 fail, for example. System 100 might also include additional gateways to facilitate communication between client device 102 and/or SSA 106 and other exchanges besides exchange 110.

In certain embodiments, system 100 includes more than one exchange 110. For example, gateway 104 may be in communication with multiple exchanges similar to exchange 110, discussed above. Such an arrangement may allow client device 102 and/or SSA 106 to trade at more than one exchange through gateway 104, for example.

In certain embodiments, gateway 104 is part of client device 102 and/or SSA 106. For example, the hardware/software components of gateway 104 may be part of the same computing platform as client device 102, SSA 106, and/or transaction message manager 108. As another example, the functionality of gateway 104 may be performed by components of client device 102, SSA 106, and/or transaction message manager 108. In certain embodiments, gateway 104 is not present. Such an arrangement may occur when client device 102 and/or SSA 106 does not need to utilize gateway 104 to communicate with exchange 110—for example, if client device 102 and/or SSA 106 have been adapted to communicate directly with exchange 110.

Figure 2:
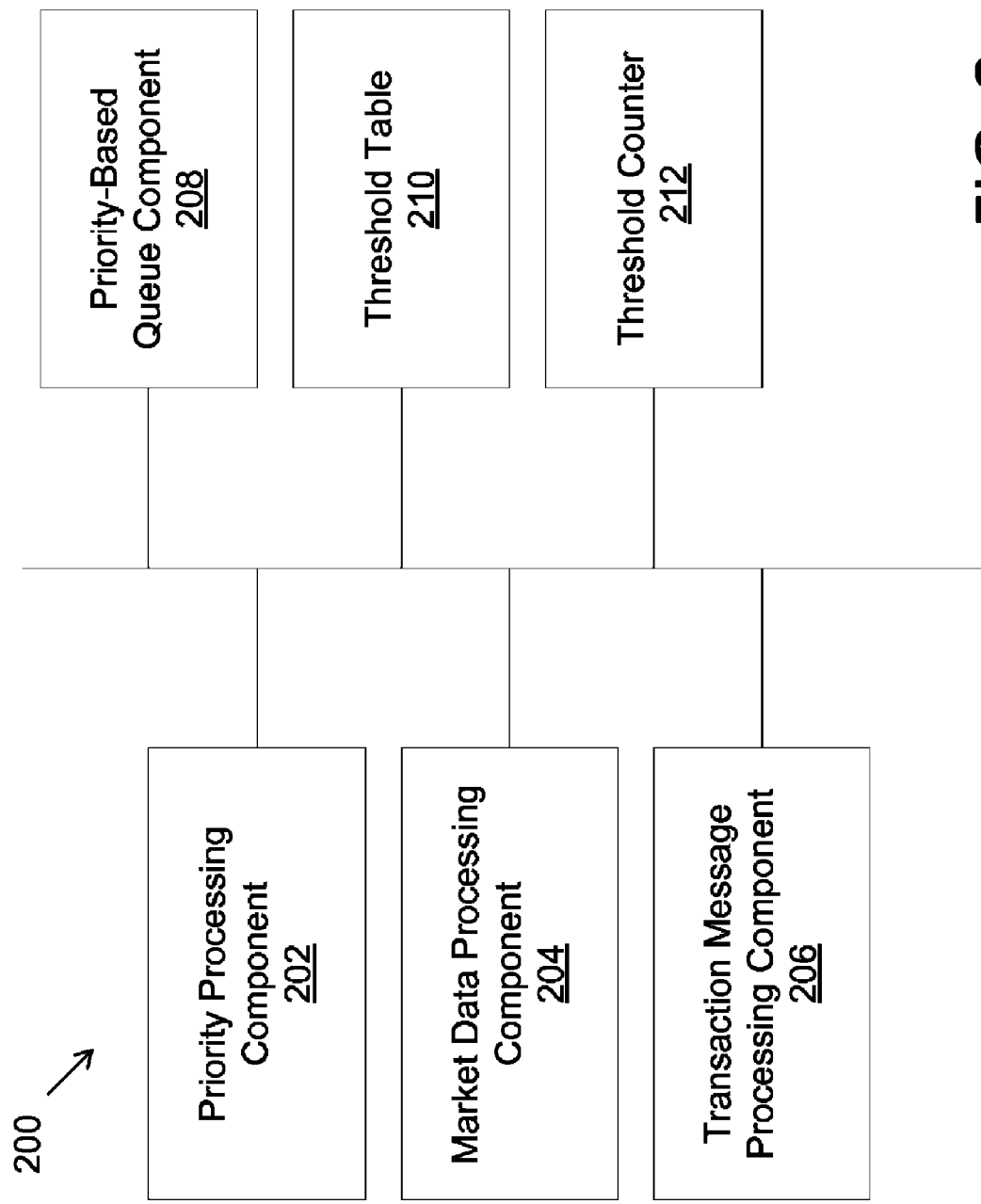
FIG. 2 illustrates a block diagram of an example transaction message manager system in which certain embodiments may be employed.

FIG. 2 illustrates an example transaction message manager system 200. The system 200 includes a priority processing component 202, a market data processing component 204, a transaction message processing component 206, a priority based queue component 208, a threshold table 210, and a threshold counter 212. The components 202-212 may be implemented by one or more computing devices. For example, priority processing component 202, market data processing component 204, transaction message processing component 206, and/or priority based queue component 208 might be part of gateway 104 shown in FIG. 1.

Priority processing component 202 determines a priority level for each transaction message to be sent to an electronic exchange. As used herein, the priority level is determined based on a potential reward or a potential risk associated with sending or not sending a transaction message to an electronic exchange as soon as possible. According to one example embodiment, the potential reward or risk for a transaction message may be determined based on a price of an order compared to the current market conditions, such as the current inside market, a quantity of the order, and a tick value.

To assess a potential reward/risk for an order, priority processing component 202 may first assign a risk/reward factor to each price level currently available in the market. The risk/reward factor corresponding to the currently available market prices may be specified as a percentage defining a likelihood of an order not getting filled or getting filled at a specific price level. According to one example embodiment, the current inside market prices may be associated with the highest likelihood of an order getting filled, such as 100% or a lower percentage, depending on the system configuration. Alternatively, if the prices are ranked based on the likelihood of an order not getting filled, the inside market may be assigned the lowest risk factor. Then, prices below or above the inside market level may be associated with progressively lower percentages or higher percentages, depending on whether the likelihood of an order getting filled, or not getting filled is measured. For example, the likelihood of an order getting filled at a price level one tick away from the current inside market may be set to 50%, then a price level two ticks away may be associated with 30%, a price level three or more ticks away may be associated with 20%, and so on.

It should be understood that risk factors assigned to prices of different tradeable objects may vary. For example, market volatility or other factors may be considered when assigning a risk factor to each price level away from the current inside market. For example, the likelihood of an order getting filled four ticks away from the current inside market for a tradeable object having a volatile market may be higher than the likelihood of an order getting filled two ticks away from the current inside market of a less volatile tradeable object.

To illustrate the concepts described above, let's assume that a first order having a quantity of 1 is to be submitted to the market at a price level one tick away from the current inside market, and a second order having a quantity of 5 is to be submitted at a price level two ticks away from the current inside market of the same tradeable object. Let's also assume that one tick is worth $1, and the risk factors of an order getting filled one tick and two ticks away from the current inside market are set to 50% and 30% respectively. To determine the order's priority level, the order's potential risk/reward may be computed by multiplying the quantity of the order by the risk factor associated with the price level of the order. Thus, the risk/reward corresponding to the first order is $0.50 ($1 for 1 lot×50%), and the risk/reward corresponding to the second order is $1.5 ($1 for 5 lots×30%). If two such quotes are being evaluated, priority processing component 202 may assign a higher priority level to the second quote based on the higher potential reward or risk determined for the second quote. It should be understood that a different reference point, other than the inside market, could be used as well. For example, a last traded price or a theoretical price could be used instead. Additionally, the computation of the expected reward or risk is not limited to the described embodiment.

Also, a specific priority level assigned to each quote by priority processing component 202 may be based on preconfigured settings. For example, a system administrator may define a number of priority levels to be used by priority processing component 202, with each priority level assigned to a range of potential risk or reward values. For example, a first priority level may be assigned to orders with a potential risk/reward in a range of $10-$8, and a second priority level may correspond to a range of $7.99-$5, etc. It should be understood that the number of priority levels may be system specific. Additionally, the risk/reward ranges associated with each profit level may be different depending on a trading group using the system. For example, the highest priority level defined for a group of high-volume traders may be set to a range of $100,000-$90,000, while the highest profit level defined for another group of traders may be set to a range of $100-$90.

While priority processing component 202 may determine a priority level for an order to be sent to an electronic exchange based on that order's parameters, the priority level for a transaction message may be determined based on order parameters of another order already working at the electronic exchange. For example, if a transaction message includes a request to delete an order already working at an exchange, a priority level of the transaction message may be determined based on the potential risk of not deleting the working order, and the working order getting filled. Similarly, if a transaction message includes a trade order modification for an order already working at an electronic exchange, a priority level for the transaction message may be based on order parameters of the working order, and the risk of the working order getting filled. Trade order modification messages may involve changing an order price or an order quantity, or changing both the order price and the order quantity. Trade order modifications are especially important in relation to trading strategies that involve trading multiple tradeable objects, such as spread trading, where delaying a quote associated with a modification may result in not achieving a desired spread price or getting legged.

Market data processing component 204 is configured to receive market data prices for each trade order. In the embodiment where a risk factor is based on a number of ticks away from the inside market, market data processing component 204 may be configured to retrieve the current best bid price and the best ask price. Different embodiments are possible as well.

If two transaction messages are to be sent at the same time, transaction message processing component 206 may use a priority level assigned to each message to determine which of the messages is to be sent first. According to yet another embodiment, in addition to determining which of the messages is to be sent based on the messages' priority levels, transaction message processing component 206 may use a predetermined transaction message policy before any message is sent. More specifically, transaction message processing component 206 may apply the transaction message policy to ensure that the amount of message traffic associated with each priority level does not exceed a predetermined message threshold defined for each priority level in threshold table 210.

In case any transaction message would cause a threshold limit associated with the priority level corresponding to the message to be exceeded, the message is queued by priority-based queue component 208. According to one embodiment, priority-based queue component 208 may include a number of queues, with each queue assigned to a predetermined priority level or a range of priority levels. For example, one queue may be used to store messages having the highest priority level, and other queues may be used to store messages associated with the progressively lower priority levels. Each transaction message queue may be stored in a memory unit of a computing device. The type of memory used may be any suitable memory, and is not limited to any particular type or structure. DRAM, RAM, FIFO buffers, FILO, etc., could be used. It should be understood that the term "queue" refers to any suitable message storage and handling mechanism, and is not limited to a traditional first-in first-out (FIFO) queue.

As mentioned above, each queue stores transaction messages assigned to a predetermined priority level and is associated with a threshold limit preconfigured for the corresponding priority level. Threshold counter component 212 may be used to update a limit counter assigned to each queue. For example, when an event occurs that causes any limit counters to decrement, the corresponding queue is analyzed to determine whether any messages stored in the corresponding queue may be transmitted to the exchange. An example event that would cause a limit counter to decrement is the passage of time with respect to a message threshold based on the number of messages allowed over a particular period of time for a specific priority level. The messages stored in that specific queue may be transmitted to the exchange via a gateway if doing so does not violate the threshold limit set for the queue.

It should be understood that some exceptions may be used when a transaction message is to be sent to an exchange, but when a transaction limit has been reached. For example, when an exchange imposes soft limits, such as when an exchange charges fees for sending transaction messages once a limit is reached, an exception may be defined such that some traders, some tradeable objects, some order types, or certain priority levels are not subject to any restrictions. In case of soft limits, a trader could elect to ignore any limits and incur extra cost in relation to messages related to high risk order, and adhere to the limits and potentially delay transaction messages related to orders with a lesser risk or reward potential. Alternatively, when an exchange imposes hard limits, such as when an exchange rejects or queues transaction messages once a limit has been reached, similar exceptions may be created. In such an embodiment, when dividing the available resources between message queues, the system may create a "spare capacity" threshold limit that may be used in special situations when one of the exception messages is received and cannot be sent because the corresponding limit has been reached.

While the example embodiments described herein illustrate the use of message transaction thresholds as applied to the reward or risk based priority levels described herein, it should be understood that the transaction thresholds could be applied in relation to priority levels determined based on other criteria as well. Other criteria for determining priority levels may be based on a different combination of order parameters, current market conditions, and historical information, such as market's price volatility, taken alone or in combination.

Figure 3:
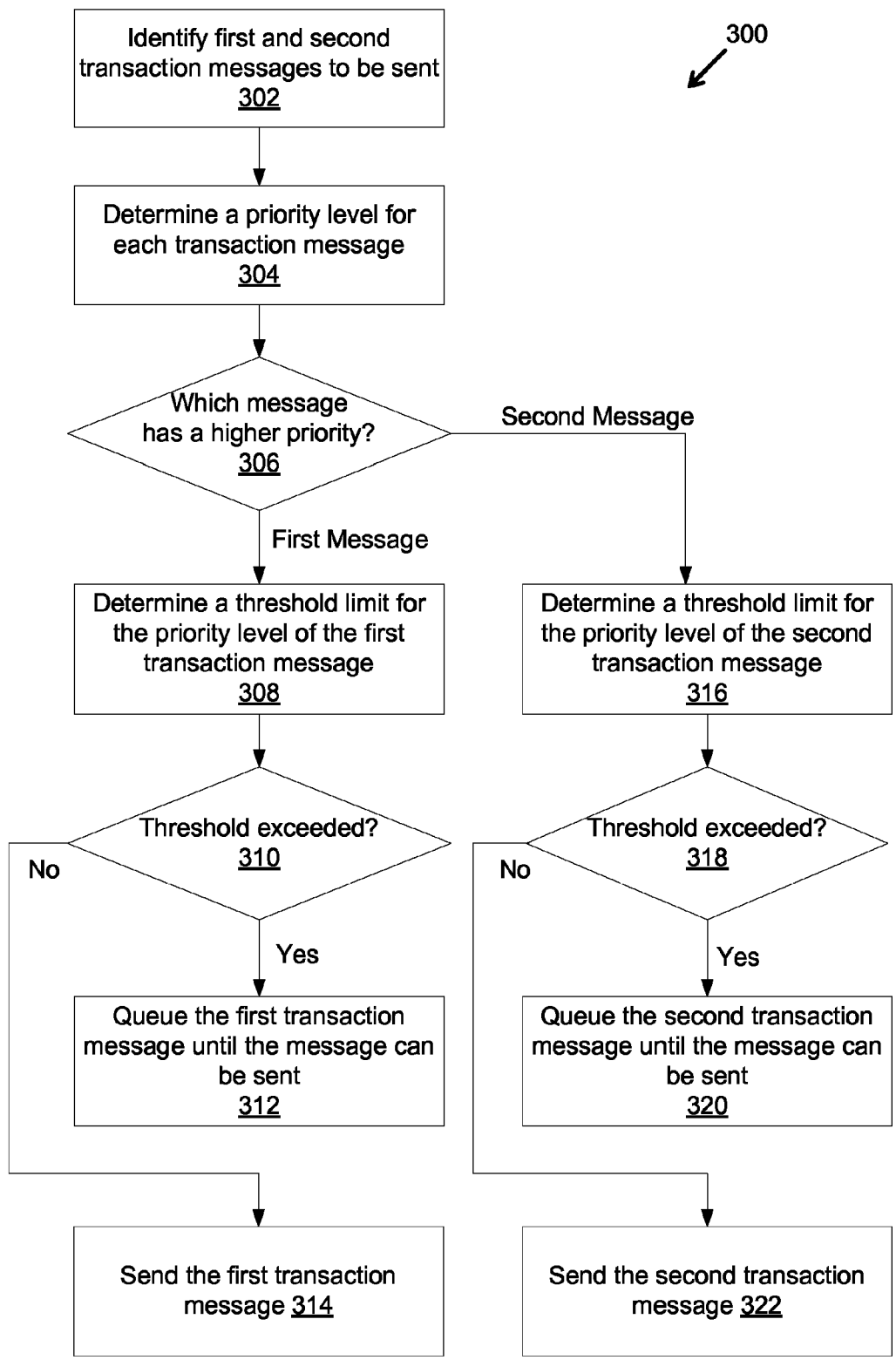
FIG. 3 illustrates an example flowchart of a process for use in processing transaction messages according to certain embodiments.

FIG. 3 illustrates a flowchart 300 of a process for use in processing transaction messages.

At step 302, first and second transaction messages are identified to be sent to an electronic exchange. It should be understood that the transaction messages may be sent to the same electronic exchange or different electronic exchanges. As mentioned earlier, the first and second transaction messages may take many different formats including a trade order to buy or sell a quantity of a tradeable object at a price, a trade order to modify another trade order already working at an electronic exchange, an order delete request to delete a trade order already working at an electronic exchange, or yet some other transaction message type, as explained above.

At step 304, a priority level for each transaction message is determined before sending the messages to one or more exchanges. As explained above, the priority levels may be determined based on a potential risk of delaying sending each message to an exchange. As mentioned earlier, the potential risk may be determined by comparing a price of an order to a predetermined market price, a quantity of the order, and further based on a monetary value of each tick of a tradeable object associated with the order. For example, a transaction message associated with a large quantity order at a price level which is close to the current inside market may be associated with a higher priority level (a higher potential risk) than a transaction message associated with a smaller quantity order at a price level that is far away from the current inside market of the same tradeable object. In other words, the order closer to the market is more likely to get filled, and if that happens, the monetary value of the potential reward is much higher for a larger quantity order than for a small quantity order.

At step 306, a determination is made with respect to which transaction message has a higher priority level based on the priority level assigned to each transaction message. At step 308, a determination is made to send the first transaction message to an electronic exchange, and, at step 316, a determination is made to send the second transaction message to an electronic exchange. According to one example embodiment when a transaction message policy is used, prior to sending the first transaction message, at step 308, a threshold limit is determined for the priority level associated with the first transaction message. At step 310, the system determines if the threshold limit is exceeded. If the threshold limit is exceeded, at step 312, the first transaction message may be queued in a message queue associated with the priority level of the first transaction message until the first transaction message can be sent to the electronic exchange. If the threshold limit is not exceeded, at step 314, the first transaction message is sent to the electronic exchange.

Referring back to step 306, if the second transaction message has a higher priority level, the system determines a threshold limit associated with the priority level of the second transaction message. At step 318, the system determines if a threshold limit associated with the second transaction message is exceeded. If the threshold limit is not exceeded, at step 322, the second transaction message is sent to the electronic exchange. Otherwise, at step 320, the second transaction message may be queued in a message queue associated with the priority level of the second transaction message until the second transaction message can be sent to the electronic exchange.

According to an example embodiment, once a transaction message having the highest priority level is processed, the process can be repeated until all of the transaction messages have been processed. In other words, once the highest priority transaction message is processed, the system may repeat the method 300, starting at step 302, so that the method takes into account the most recent market conditions as well as any other new transaction messages that are to be sent to an electronic exchange at the same time. Alternatively, if a number of transaction messages are to be sent at the same time, the system may determine the priority level for each message in the group, and the process may be executed for each message down the list of the priority until all transaction messages in the group are processed. Then, the process may be repeated for any new transaction messages after the group of transaction messages is processed. It should be understood that different embodiments are possible as well.

A Spread Trading Example

The following example illustrates one example embodiment of risk/reward based processing of transaction messages that may be generated by an automatic spread trading tool. In relation to the example embodiment, assume the following scenario:
 a. Creation of a two-legged spread AB, which consists of buying tradeable object A (e.g., buying leg A) and selling tradeable object B (e.g., selling leg B);
 b. The spread is configured such that the automatic spread trading tool quotes a single leg of the spread, e.g., quotes leg A, based on market conditions in Leg B; and
 c. The current inside markets for both tradeable objects are as follows:
  i. Leg A: Bid at 98 and Sell at 100
  ii. Leg B: Bid at 98 and Sell at 100.

Assuming that a trader wants to buy the spread AB at 1, the automatic spread trading tool may submit a buy order for Leg A at 99. The price is calculated as a sum of the current bid price for Leg B (e.g., 98, in this example), and the desired spread AB price (e.g., 1, in this example), i.e., $Bid_B + Bid_{AB} = 98 + 1 = 99$. Now, let's assume that the same or different trader places another order to buy 100 units of the spread AB at the same price of 1. In response, the spread trading tool may place another buy order to buy 100 lots of Leg A at the price of 99. As such there are two orders being quoted for Leg A:
 a. A first trade order to buy a quantity of 1 at 99; and
 b. A second trade order to buy a quantity of 100 at 99.

Now, let's assume that the bid price for Leg B moves down to 97. According to the spread configuration and the changed market conditions, to maintain the desired spread price of 1, the automatic spread trading tool would re-quote the first trade order to 98 (e.g., 97+1) and the second order to 98.

Conventionally, the automatic spread trading tool would process and send trade orders according to the time when the orders were originally placed. Thus, according to the conventional method, the first order would be sent first. According to an example embodiment, the system prioritizes the orders based on a potential risk/profit associated with not sending/sending the order right away. Because the bid price for Leg B moved down from 98 to 97, it is no longer possible to complete the spread (buy spread AB) at the desired spread price of 1. Unless a trader buys Leg B at the currently available price of 97, the trader might be legged. In this example, the risk factor based on the price for the first trade order and the second order is the same (the number of ticks away from the current inside market for each order of Leg B is the same). As explained earlier, the risk factor may be determined based on the price of the currently pending order compared to the current market conditions, or based on the price of an order to be entered compared to the current market conditions. However, because the second trade order quantity is higher than the first trade order quantity (100 vs. 1), the second trade order is associated with the higher priority level (e.g., it is associated with a higher potential risk if it is not sent as soon as possible). In other words, the second order has a higher priority because of there is a higher potential risk if the second order gets legged. Consequently, the automatic spread trading tool would first send a transaction message to re-price the second trade order to 98, and then a transaction message to re-price the first trader order to 98. Additionally, priority level based thresholds may be checked prior to sending the orders.

In the above example, the two orders were prioritized based on the potential risk. However, as explained before, orders may be prioritized based on the potential reward using the same priority rules.

In relation to the example embodiment, assume the following scenario:
 a. Creation of a two-legged spread AB, which consists of selling tradeable object A (e.g., selling leg A) and buying tradeable object B (e.g., buying leg B);
 b. The spread is configured such that the automatic spread trading tool quotes a single leg of the spread, e.g., quotes leg A, based on market conditions in Leg B; and
 c. The current inside markets for both tradeable objects are as follows:
  i. Leg A: Bid at 98 and Sell at 100
  ii. Leg B: Bid at 98 and Sell at 100.

Assuming that a trader wants to sell the spread AB at 1, the automatic spread trading tool may submit a sell order for Leg A at 101. The price is calculated as a sum of the current ask price for Leg B (e.g., 100) and the desired spread AB price (e.g., 1), i.e., $Ask_B + Ask_{AB} = 100 + 1$. Now, let's assume that the same or different trader places another sell order to sell 100 of spread AB at the same price of 1. In response to that request, the automatic spread tool may submit a sell order to sell a quantity of 100 for Leg A at a price of 101. As such, there are two orders being quoted for Leg A:
 a. A first trade order to sell a quantity of 1 at 101; and
 b. A second trade order to sell a quantity of 100 at 101.

Let's assume that a buy order is placed in Leg A at 101 for a sufficiently large quantity to fill both the first trade order and the second trade order. Thus, both the first and second spread orders get their sell Leg A orders filled. Now, the automatic spread trading tool might send two orders for Leg B to hedge the positions created by the fill of the first trade order and the second trade order. In other words, a first trade order to buy a quantity of 1 for Leg B at 100, and a second trade order to buy a quantity of 100 for Leg B at 100 are to be sent. Using the risk factor assigned to each price and the quantity of each order, the system may determine that the potential profit associated with the second order to sell 100 of Leg B at 100 is higher. In other words, the current inside market for Leg B may quickly change, so in order to maximize a potential profit, the automatic spread trading tool sets the higher priority to the larger quantity order to improve the chances of getting it filled at the desired price. Thus, the second order is assigned a higher priority level and should be sent first to an electronic exchange. As explained above, the priority levels of the first and second orders may be used to determine an applicable threshold level, and the system may check if each applicable threshold level has not been reached prior to sending the orders.

While the above examples described the example embodiments for priority-based processing of two-legged spreads, it should be understood that the example embodiments could be extended to multi-legged spreads, such as when a single leg price movement requires re-quoting of multiple legs. Another example embodiment could be applied to placing orders for two spreads that have one common leg, such as a first spread consisting of Leg A and Leg B, and a second spread consisting of Leg C and Leg B, where a price movement of Leg B may cause re-quoting of Leg A and Leg C. In such an embodiment, in addition to taking into account an order price and an order quantity, market volatility as well as a tick value of Leg A and Leg C may be taken into consideration when determining a priority level for re-quoting each trade order.

As explained above, the risk factor assigned to each price level in a highly volatile market may be higher than in a slower market. For example, the risk factor corresponding to a price 5 levels away from the current inside market price, or yet some other price indicator, of a tradeable object having a highly volatile market, may be higher than a risk factor associated with a price level 2 ticks away from the current inside market of another tradeable object. Thus, when market volatility is a factor in determining priority levels of two orders for two different tradeable objects, a higher priority level may be assigned to a smaller quantity order resting farther away from a preset price indicator in one market as compared to another order having a larger order quantity at a price closer to a price indicator in another market.

Synthetic Order Type Example

While the examples above focus on sending transaction messages related to a trading strategy, it should be understood that the example embodiments can be applied in any system where two or more transaction messages are to be sent substantially at the same time. According to one embodiment, the example methods can be applied when managing various types of synthetic orders.

According to one example, the described embodiments may be used in relation to trailing stop limit orders. A trailing stop limit order is designed to allow a trader to specify a limit on the maximum possible loss, without setting a limit on the maximum possible gain. A sell trailing stop limit order may move with the market price, and the stop trigger price may be continuously recalculated at a fixed amount below the market price, based on the user-defined "trailing" amount. The limit order price is also continually recalculated based on the limit offset. As the market price rises, both the stop price and the limit price rise with the market price and stay away from the current market price by the trail amount and the limit offset respectively. However, if the market price falls, both the stop price and the limit price remain unchanged. When the market reaches the stop price, a limit order may be submitted at the last calculated limit price. A buy trailing stop limit order is a mirror image of a sell trailing stop limit order, and is generally used in falling markets.

Let's assume that a trader is long 100 shares of a tradeable object having a current market price of $90.15. Assuming that a trailing amount is set to $0.15 and a limit offset is set to $0.10, a stop price is set to $90, and a limit price is set to $89.90 (calculated using the stop price and the limit offset).

Once an order is submitted, let's assume that the market price rises to $91. When the market price rises to $91, the trailing stop price and the limit price are recalculated to $90.85 and $90.75, respectively. When the market price drops and penetrates the stop price, such as when the market drops to $90.80, the order is triggered. In one embodiment, the sell limit order may be submitted at the last calculated limit price of $90.75. Alternatively, in an embodiment where limit orders are submitted and are "on hold" every time the limit price is recalculated, the limit order may be already pending at $90.75 when the market drop is detected.

When more than one trailing stop limit order is managed in the example system described above, and more than one order requires adjustment at the same time, the transaction message manager may use the methods described above to prioritize which adjustments should be processed and sent first. As explained above, a priority level for each order may be determined based on a potential profit or loss calculated for each order. As explained earlier, the potential loss or profit may be calculated based on an order price compared to a price indicator, such as the current inside market or the last traded price, and further based on an order quantity, as well as other parameters, such as market volatility, or yet some other parameter, such as a tick value, if two more orders are for different tradeable objects.

One or more of the steps of the method discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for processing transaction messages in an electronic trading environment, comprising:
   determining, at a computing device, that a first transaction message and a second transaction message are to be sent to at least one electronic exchange at substantially the same time;
   determining a priority level for each of the first transaction message and the second transaction message based on a level of risk of not sending the first transaction message and the second transaction message to at least one electronic exchange, wherein the level of risk for each of the first transaction message and the second transaction message is based at least on a price level and a quantity of an order associated with each transaction message, wherein the first transaction message includes a first new order, and wherein the second transaction message includes a second new order;

determining that the first transaction message has a higher priority level;

determining a threshold limit associated with the priority level of the first transaction message;

if the threshold limit is not reached, sending the first transaction message to a first electronic exchange prior to sending the second transaction message to a second electronic exchange; and if the threshold limit is reached, storing the first transaction message in a queue associated with the priority level until a predetermined event is detected.

2. The method of claim 1, wherein the first electronic exchange is the same as the second electronic exchange.

3. The method of claim 1, wherein the first electronic exchange and the second electronic exchange are different electronic exchanges.

4. The method of claim 1, wherein at least one of the first transaction message and the second transaction message comprises an order to buy or sell a tradeable object.

5. The method of claim 1, wherein the level of risk is based on a potential monetary reward of sending the first transaction message as soon as possible.

6. The method of claim 1, wherein the level of risk is based on a potential monetary risk of not sending the first transaction message as soon as possible.

7. The method of claim 1, wherein the level of risk associated with each of the first transaction message and the second transaction message is further based on a market volatility corresponding to a tradeable object associated with each of the first transaction message and the second transaction message.

8. The method of claim 1, wherein the level of risk associated with each of the first transaction message and the second transaction message is further based on a tick value corresponding to a tradeable object associated with each of the first transaction message and the second transaction message.

* * * * *